United States Patent
Ergen et al.

(10) Patent No.: US 8,152,642 B2
(45) Date of Patent: Apr. 10, 2012

(54) APPARATUS AND METHODS FOR AUTHENTICATING A USER OF AN ENTERTAINMENT DEVICE USING A MOBILE COMMUNICATION DEVICE

(75) Inventors: Charles W. Ergen, Englewood, CO (US); Max S Gratton, Lakewood, CO (US)

(73) Assignees: EchoStar Technologies L.L.C., Englewood, CO (US); DISH Network L.L.C., Englewood, CO (US)

( * ) Notice: Subject to any disclaimer, the term of this patent is extended or adjusted under 35 U.S.C. 154(b) by 785 days.

(21) Appl. No.: 12/046,568

(22) Filed: Mar. 12, 2008

(65) Prior Publication Data
US 2009/0233715 A1    Sep. 17, 2009

(51) Int. Cl.
*G06F 17/00*    (2006.01)
(52) U.S. Cl. ......................................... 463/41
(58) Field of Classification Search .............. 463/40–42; 705/34–35; 709/201; 348/723
See application file for complete search history.

(56) References Cited

U.S. PATENT DOCUMENTS

| | | | |
|---|---|---|---|
| 5,138,649 A | 8/1992 | Krisbergh et al. | |
| 5,734,371 A | 3/1998 | Kaplan | |
| 5,901,366 A | 5/1999 | Nakano | |
| 6,549,792 B1 | 4/2003 | Cannon et al. | |
| 6,698,020 B1 | 2/2004 | Zigmond | |
| 6,732,366 B1 | 5/2004 | Russo | |
| 6,741,684 B2 | 5/2004 | Kaars | |
| 6,850,221 B1 | 2/2005 | Tickle | |
| 7,155,213 B1 | 12/2006 | Almeda et al. | |
| 7,167,122 B2 | 1/2007 | Stefanik | |
| 7,194,259 B2 | 3/2007 | DeLine | |
| 2002/0056112 A1 | 5/2002 | Dureau et al. | |
| 2002/0129088 A1* | 9/2002 | Zhou et al. | 709/200 |
| 2003/0093813 A1 | 5/2003 | Shintani et al. | 725/133 |
| 2003/0222856 A1 | 12/2003 | Fedorak et al. | |
| 2004/0066302 A1 | 4/2004 | Menard et al. | |
| 2004/0117038 A1 | 6/2004 | Karaoguz | |
| 2004/0178995 A1 | 9/2004 | Sterling | |
| 2004/0203374 A1 | 10/2004 | Zilliacus | |
| 2004/0250273 A1 | 12/2004 | Swix et al. | |
| 2005/0275758 A1* | 12/2005 | McEvilly et al. | 348/725 |
| 2006/0031549 A1 | 2/2006 | Janik et al. | |
| 2006/0109263 A1 | 5/2006 | Wang et al. | |

(Continued)

FOREIGN PATENT DOCUMENTS

KR    10-2007-0100966    10/2007

OTHER PUBLICATIONS

Ergen et. al.,U.S. Appl. No. 12/046,555, filed Mar. 12, 2008.

(Continued)

*Primary Examiner* — Ronald Laneau
(74) *Attorney, Agent, or Firm* — Seed IP Law Group, PLLC

(57) ABSTRACT

Various embodiments of apparatus and/or methods are described for remotely controlling an entertainment device using a mobile communication device. A user utilizes a mobile communication device to input information that requests manipulation of playback of content outputted for presentation by an entertainment device. The mobile communication device transmits the user input to the entertainment device and furthers transmits identifying data regarding the user. Responsive to receiving the user input and the identifying data, the mobile communication device authenticates the user and outputs the content for presentation to a user based on the user input.

23 Claims, 10 Drawing Sheets

U.S. PATENT DOCUMENTS

| | | | |
|---|---|---|---|
| 2006/0229124 A1 | 10/2006 | Walker et al. | |
| 2006/0233519 A1 | 10/2006 | Narita | |
| 2006/0271953 A1 | 11/2006 | Jacoby et al. | 725/34 |
| 2007/0050054 A1 | 3/2007 | Sambandam Guruparan et al. | |
| 2007/0080940 A1 | 4/2007 | Aoki et al. | 345/158 |
| 2007/0124779 A1 | 5/2007 | Casey et al. | |
| 2007/0130582 A1 | 6/2007 | Chang et al. | 725/37 |
| 2007/0152961 A1 | 7/2007 | Dunton et al. | |
| 2007/0222750 A1 | 9/2007 | Ohta | |
| 2007/0240179 A1 | 10/2007 | Lavigne | 725/14 |
| 2007/0252813 A1 | 11/2007 | Liberty et al. | |
| 2007/0257880 A1 | 11/2007 | Nakao et al. | |
| 2007/0257886 A1 | 11/2007 | Uotani et al. | |
| 2008/0059060 A1 | 3/2008 | Irish | |
| 2008/0077950 A1* | 3/2008 | Burke et al. | 725/1 |
| 2009/0133070 A1 | 5/2009 | Hamano et al. | 725/46 |
| 2009/0249407 A1* | 10/2009 | Manne et al. | 725/68 |
| 2009/0319672 A1* | 12/2009 | Reisman | 709/227 |
| 2010/0280897 A1* | 11/2010 | Elia et al. | 705/14.31 |
| 2011/0016503 A1* | 1/2011 | Schaefer et al. | 725/115 |

OTHER PUBLICATIONS

Invitation to Pay Additional Fees and Partial Search Report Received for PCT Application PCT/US2009/034559, mailed on Nov. 18, 2009.

International Search Report for PCT/US2009/034559 mailed on Jan. 18, 2010.

Office Action dated Jan. 20, 2012, for corresponding Korean Application No. 10-2010-7020215, 5 pages.

Kalva et al., "Multi-view Video Navigation Using Motion Sensing Remote Controllers," *International Conference on Consumer Electronics,* IEEE, Las Vegas, Nevada, Jan. 9-13, 2008, pp. 1-2.

* cited by examiner

APPARATUS AND METHODS FOR AUTHENTICATING A USER OF AN ENTERTAINMENT DEVICE USING A MOBILE COMMUNICATION DEVICE

BACKGROUND

The average home presently includes a variety of entertainment devices, each remotely operated by a separate remote control. Therefore, a user often needs to keep track of multiple remote controls while experiencing audio and/or video content. This has been a problem for many users, and modern video viewing systems have become so complex that many users cannot navigate the controls of entertainment devices without the assistance of the associated remote controls. However, because remote controls are easily misplaced, it becomes difficult for users to navigate their video viewing systems without the assistance of advanced navigation tools provided by remote controls.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the reception, processing, outputting and communication of content from one or more sources, via one or more communication mediums (or networks), to one or more communication devices for presentation to one or more end-users. More particularly, the various embodiments described herein generally provide apparatus, systems and methods which facilitate controlling the presentation of content by entertainment devices using a mobile communication device. In short, the various embodiments described provide apparatus, systems and/or methods in which a mobile communication device is utilized to remotely control an entertainment device.

In at least one embodiment, the content to be received, processed, outputted and/or communicated may come in any of various forms including, but not limited to, audio, video, data, information, or otherwise. Likewise, the entertainment device to be controlled may comprise any device capable of presenting audio, video and/or audio/video (A/V) content. It is to be appreciated that content may be provided from any source, such as an over-the-air broadcast, a satellite or cable television distribution system, a digital video disk (DVD) or other optical disk, the internet or other communication networks and the like.

A user utilizes a mobile communication device (e.g., a mobile telephone, personal digital assistant (PDA) and the like) to wirelessly control the output and presentation of content by the entertainment device. In other words, the mobile communication device operates as a remote control for the entertainment device. The user inputs commands into the mobile communication device and the commands are transmitted to the entertainment device. The entertainment device responsively processes the commands and manipulates the output of presentation content accordingly. In at least one embodiment, the mobile communication device transmits identifying data regarding the user to the entertainment device which is used to authenticate the user on the entertainment device or other devices communicatively coupled to the entertainment device. Thus, the user is not repeatedly required to manually enter identifying information, such as a personal-identification number (PIN), username/password, access code and the like in order to access content presented by the entertainment device.

Figure 1:
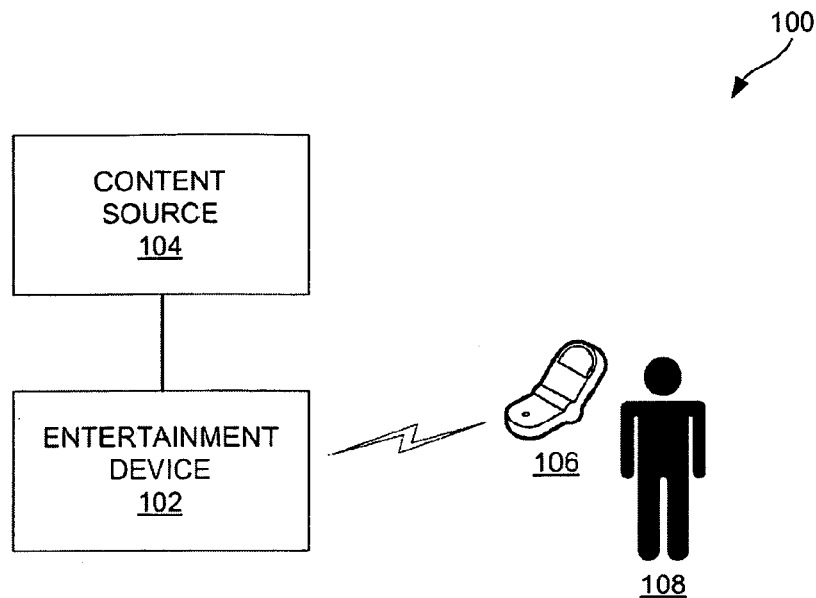
FIG. 1 illustrates an embodiment of an entertainment system.

FIG. 1 illustrates an embodiment of an entertainment system 100. The entertainment system 100 presents content to a user 108. In at least one embodiment, the content presented to the user 108 includes a video stream, such as a television program, movie or other recorded content and the like. The entertainment system 100 includes an entertainment device 102, a content source 104 and a mobile communication device 106. Each of these components is discussed in greater detail below. The entertainment system 100 may include other devices, components or elements not illustrated for the sake of brevity.

The entertainment device 102 is operable to receive content from one or more content source(s) 104, and to present the received content to the user 108. In at least one embodiment, the entertainment device 102 is a display device configured to display content to the user 108. The entertainment device 102 may receive a video stream in any format (e.g., analog or digital format), and present the video stream to the user 108. The entertainment device 102 may be further configured to display menus and other information that allow a user 108 to control the presentation of content by the entertainment device 102. In other embodiments, the entertainment device 102 is a set-top box (e.g., a satellite or cable television converter box), digital video recorder (DVR) or other similar device that processes and provides one or more audio and/or video output streams to a display device for presentation to the user 108. It is to be appreciated that the entertainment device 102 may also be embodied as an apparatus combining the functionality of a display device and a set-top box, digital video recorder (DVR) and the like. In other embodiments, the entertainment device 102 may be operable to present other types of presentation content to the user 108, such as audio content, images, games and other data.

The content source 104 may comprise any system or apparatus configured to provide presentation data, such as a video stream, to the entertainment device 102. The content source 104 may be external or internal to the entertainment device 102. The entertainment device 102 and the content source 104 may be communicatively coupled through any type of wired or wireless connection, communication network and the like.

Exemplary content sources include television distribution systems (e.g., over-the-air distribution systems, cable television distribution systems, satellite television distribution systems and broadband distribution systems), DVD players and other optical disk players, digital storage mediums (e.g., DVRs) and the internet.

The mobile communication device 106 may comprise any system or apparatus configured to provide communication services to the user 108. The communication services provided by the mobile communication device 106 may comprise voice, data and/or video services. The mobile communication device 106 may communicate using any type of communication medium or protocol. For example, the mobile communication device 106 may wirelessly communicate with a communication network (not shown in FIG. 1) over a radio frequency (RF) communication link. In at least one embodiment, the mobile communication device 106 is a wireless telephone that communicates over a cellular network.

The mobile communication device 106 is further configured to wirelessly communicate with the entertainment device 102. The mobile communication device 106 and the entertainment device 102 may communicate over any type of wireless communication link, such as an RF or infrared (IR) communication link. More particularly, the mobile communication device 106 receives user input requesting to control the presentation of content by the entertainment device, and transmits the user input to the entertainment device 102 for processing. Responsive to receiving the user input and/or other information from the mobile communication device 106, the entertainment device 102 modifies the presentation of the content by the entertainment device 102.

In at least one embodiment, the presentation content presented by the entertainment device 102 is locked and only accessible to the user 108 upon authentication. For example, specified channels of a television broadcast service may only be accessible by a parent or other designated users. Thus, the entertainment device 102 only presents the "locked" or "restricted" content upon determining that an authorized user is requesting the content.

The entertainment device 102 authenticates a user based on information provided by the mobile communication device 106. In at least one embodiment, the mobile communication device 106 transmits identifying data regarding a user to the entertainment device 102 with every command transmitted to the entertainment device 102. In other embodiments, the mobile communication device 106 transmits the identifying data to the entertainment device 102 upon transmission of only specified commands. For example, the mobile communication device 106 may transmit the identifying data with commands that request to change the content presented by the entertainment device 102 such a power-on commands, channel change commands, commands selecting to view recorded videos and commands to purchase content. Thus, the mobile communication device 106 may not transmit the identifying data to the entertainment device 102 with commands that do not change the content presented by the entertainment device 102, such as mute or volume change commands, trick play mode commands, power-off commands and the like. In at least one embodiment, the mobile communication device 106 transmits the identifying data to the entertainment device 102 responsive to a query. In other words, the entertainment device 102 determines when the identifying data is needed to authenticate the user responsive to a command, and queries the mobile communication device 106 for the identifying data automatically without user intervention.

The entertainment device 102 may be remotely controlled by multiple users each utilizing their own mobile communication device 106. By receiving identifying data from the mobile communication device 106, the entertainment device 102 becomes aware of which individual is actually watching the content. The entertainment device 102 can thus implement various functions which typically require identifying a user 108, without requiring the user 108 to repeatedly manually provide identifying information.

As discussed above, the entertainment device 102 may control access to certain types of content depending on which user 108 utilizes their personal mobile communication device 106 to input a command to the entertainment device 102. Thus, parents may lock specific channels, specific types of pay-per-view (PPV) or video-on-demand (VOD) content, recorded or stored content which can only be accessed using the parent's mobile communication device 106. For example, when a child utilizes their own mobile communication device 106 to access the content of the entertainment device 102, they will be restricted from accessing the locked content because the entertainment device 102 will not authenticate the child based on the identifying data provided by the mobile communication device 106.

In at least one embodiment, user accounts with usage timers may be provided on the entertainment device 102 that are accessed based on the identifying data provided by the mobile communication device 106. For example, the user 108 (e.g., a child) may be restricted to experiencing 1 hour of content per day, 12 hours per week or 60 hours per month. Thus, as the user 108 experiences content, their associated time budget is decremented based on the time spent experiencing the content. When the user 108 powers on the entertainment device 102 with a command from the mobile communication device 106, the entertainment device 102 authenticates the user 108 based on the identifying data provided by the mobile communication device 106 and begins decrementing the time budget for the user 108. If the user 108 exceeds the time budget for the specified time period, then the entertainment device 102 restricts further access to content. For example, the entertainment device 102 may power-off or cease the output of the presentation content to the user 108.

Figure 2:
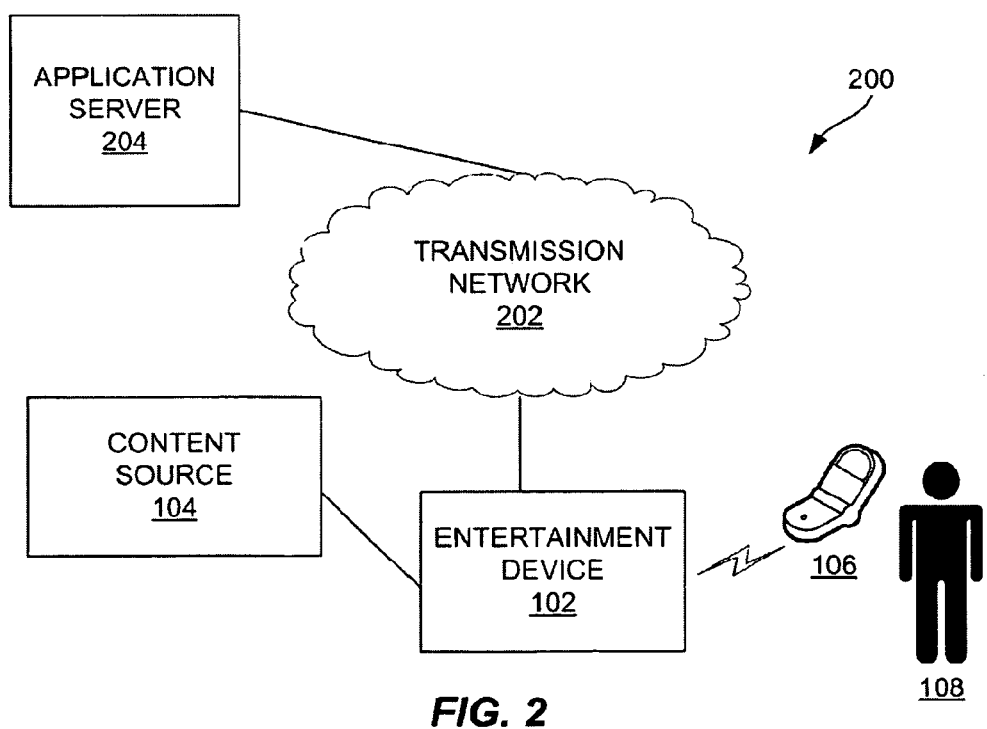
FIG. 2 illustrates an embodiment of a communication system.

The identifying data provided to the entertainment device 102 by the mobile communication device 106 may also be utilized in communications between the entertainment device 102 and a remote server or device. FIG. 2 illustrates an embodiment of a communication system 200. The communication system 200 is configured to present content to the user 108. The content communication system 200 includes an entertainment device 102, a content source 104, a mobile communication device 106, a transmission network 202 and an application server 204. Each of these components is discussed in greater detail below. The description of components common to FIG. 1 is omitted herein for the sake of brevity. Further, the communication system 200 may include other components, devices or elements not illustrated for the sake of brevity.

The entertainment device 102 is configured to communicate with an application server 204 through the transmission network 202. In at least one embodiment, the entertainment device 102 and the application server 204 communicate over an internet connection or other type of local area network (LAN) or wide area network (WAN). Exemplary data transmitted from the entertainment device 102 to the application server 204 includes PPV ordering information, error and diagnostic reports regarding the entertainment device, interactive television information (e.g., user responses to on-screen prompts), demographic information, audio and video chat data, survey data and user generated content. In at least one embodiment, the application server 204 may also transmit data to the mobile communication device 106 through the entertainment device 102. For example, the application server 204 may provide the entertainment device 102 with buddy lists, social networking profiles, programming guides, video programming and the like which are further transmitted to the mobile communication device 106 and presented to the user on the mobile communication device 106.

Application server 204 is operable for receiving, generating and communicating content by and between entertainment device 102 and other systems and devices. In at least one embodiment, the application server 204 is operable for receiving authentication requests, health and diagnostic reports, PPV ordering information, demographic information, social networking profile updates and the like from the entertainment device 102 and further processing the received data according to desired design criteria. For example, an authentication request may be received from the entertainment device 102 requesting access for a user to locked presentation content, such as a PPV movie. PPV ordering information received from the entertainment device 102, whether as part of an authentication request or part of aggregated information from a set-top box, may be utilized for generating a bill for the user 108. Health and diagnostic information may be used to identify problems with the entertainment device 102, either individually or across an entire product line. In at least one embodiment, the application server 204 may transmit firmware or software updates to the entertainment device 102 responsive to processing the health and diagnostic information.

In at least one embodiment, the application server 204 is operable for receiving demographic information from the entertainment device 102 through the mobile communication device 106. The generation of the demographic information is described in further detail below. In some embodiments, the application server 204 receives and processes data received from the entertainment device 102, and responsively populates and/or updates buddy lists, social networking profiles and the like related to the user 108.

Figure 3:
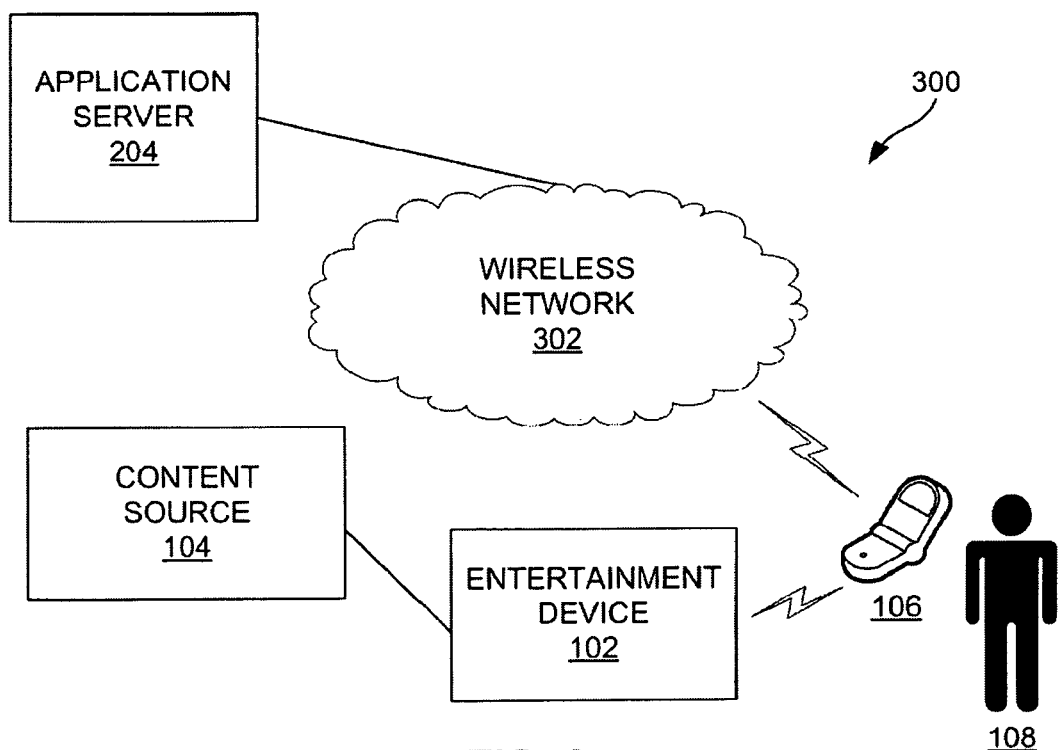
FIG. 3 illustrates an embodiment of a communication system.

In at least one embodiment, the mobile communication device 106 may act as a backchannel for data transmitted from the entertainment device 102 to the application server 204. FIG. 3 illustrates an embodiment of a communication system 300. The communication system 300 is configured to present content to the user 108. The communication system 300 includes an entertainment device 102, a content source 104, a mobile communication device 106, a wireless network 302 and an application server 204. Each of these components is discussed in greater detail below. The description of components common to FIGS. 1-2 is omitted herein for the sake of brevity. Further, the communication system 300 may include other components, devices or elements not illustrated for the sake of brevity.

The mobile communication device 106 is configured to wirelessly communicate with an application server 204 through the wireless network 302. In at least one embodiment, the mobile communication device 106 receives data from the entertainment device 102, and transmits the data to the application server 204 through the wireless network 302. The entertainment device 102 may provide the mobile communication device 106 with any type of data for transmission to the application server 204. Exemplary data transmitted from the entertainment device 102 to the application server 204 includes PPV ordering information, error and diagnostic reports regarding the entertainment device, interactive television information (e.g., user responses to on-screen prompts), demographic information, authentication requests, audio and video chat data, survey data and user generated content. In at least one embodiment, the application server 204 may also transmit data to the entertainment device 102 through the mobile communication device 106. For example, the application server 204 may provide the entertainment device 102 with buddy lists, social networking profiles, programming guides, video programming, updated firmware and the like.

Figure 4:
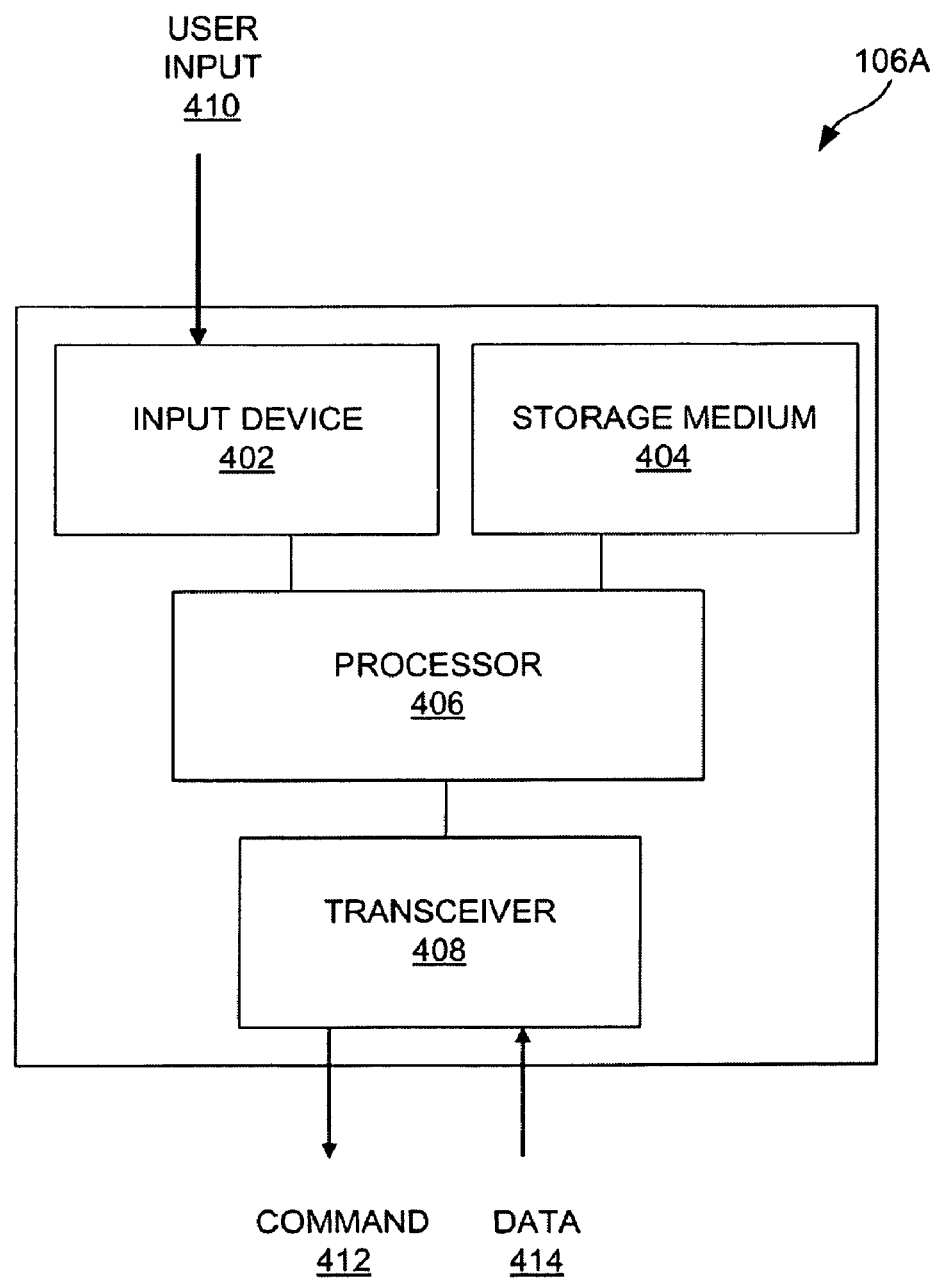
FIG. 4 illustrates an embodiment of a mobile communication device of FIG. 2.

FIG. 4 illustrates an embodiment of a mobile communication device 106A of FIG. 2. FIG. 4 will be discussed in reference to the communication system 200 illustrated in FIG. 2. The mobile communication device 106A. Includes an input device 402, a storage medium 404, a processor 406 and a transceiver 408. Each of these components is discussed in greater detail below. The mobile communication device 106A may include other components, devices or elements not illustrated for the sake of brevity.

The input device 402 is operable for receiving user input 410 from the user 108 (see FIG. 2). In at least one embodiment, the input device 402 is a keypad typically found on wireless telephones. A user may utilize the keypad to input channel numbers, control the volume of the entertainment device 102 (see FIG. 2), navigate menus and/or control other functions of entertainment device 102. For example, the user input 410 may request playback of locked presentation content available for output by the entertainment device 102 (see FIG. 2). In at least one embodiment, the input device 402 comprises a touch screen that displays a virtual remote control. In other words, the input device 402 displays on screen an image of a remote control utilized to remotely operate the entertainment device 102 (see FIG. 2). The details of the virtual remote control will be discussed in greater detail below.

The storage medium 404 stores identifying data regarding the user 108 (see FIG. 2) of the mobile communication device 106A. The storage medium 404 may comprise any type of non-volatile storage medium, such as internal or removable flash memory and other types of memory cards. Exemplary identifying data regarding the user 108 (see FIG. 2) includes a personal identification number, username and/or password, access code or phone number. It will be appreciated that any type of identifying-data may be utilized by the entertainment device 102 (see FIG. 2) to authenticate the user 108.

The processor 406 is operable for generating commands that are compatible with the entertainment device 102 (see FIG. 2). The processor 406 receives the user input 410 from the input device 402 and translates the user input 410 and/or the identifying data into the command 412. The identifying data may be included in the command 412 or may be provided to the entertainment device 102 separately responsive to a query.

In at least one embodiment, the processor 406 customizes the appearance of a virtual remote control displayed on the input device 402. For example, the buttons of the virtual remote control displayed by a touch screen of the input device 402 may be customized based on a particular menu displayed on screen by the entertainment device 102. In some embodiments, the processor 406 controls the transmission of data from the entertainment device 102 (see FIG. 2) to the application server 204.

The transceiver 408 is operable for wirelessly transmitting data, such as the command 412, to the entertainment device 102. The transceiver 408 is also operable for receiving the data 414 from the entertainment device 102 and further transmitting the data 414 to other devices, such as the application server 204. While the transceiver 408 is described as having bidirectional transmission capability, it is to be appreciated that mobile communication device 106A may alternatively include a wireless transmitter providing transmission only capability. The transceiver 408 may operate using any type of IR or RF communication link, including WiFi, Bluetooth, cellular communication and the like. In at least one embodiment, the transceiver 408 is operable for transmitting data across multiple types of communication links. For example, the transceiver 408 may receive the data 414 from the entertainment device 102 (see FIG. 2) over a WiFi link, and may reformat the data 414 for transmission to the application server 204 over the wireless network 402. In some embodiments, the mobile communication device 106A may include multiple transceivers, transmitters and/or receivers capable of handling reception and/or transmission across multiple types of communication links.

Those of ordinary skill in the art will appreciate that the various functional elements 402 through 408 shown as operable within the mobile communication device 106A may be combined into fewer discrete elements or may be broken up into a larger number of discrete functional elements as a matter of design choice. Thus, the particular functional decomposition suggested by FIG. 4 is intended merely as exemplary of one possible functional decomposition of elements within the mobile communication device 106A.

Figure 5:
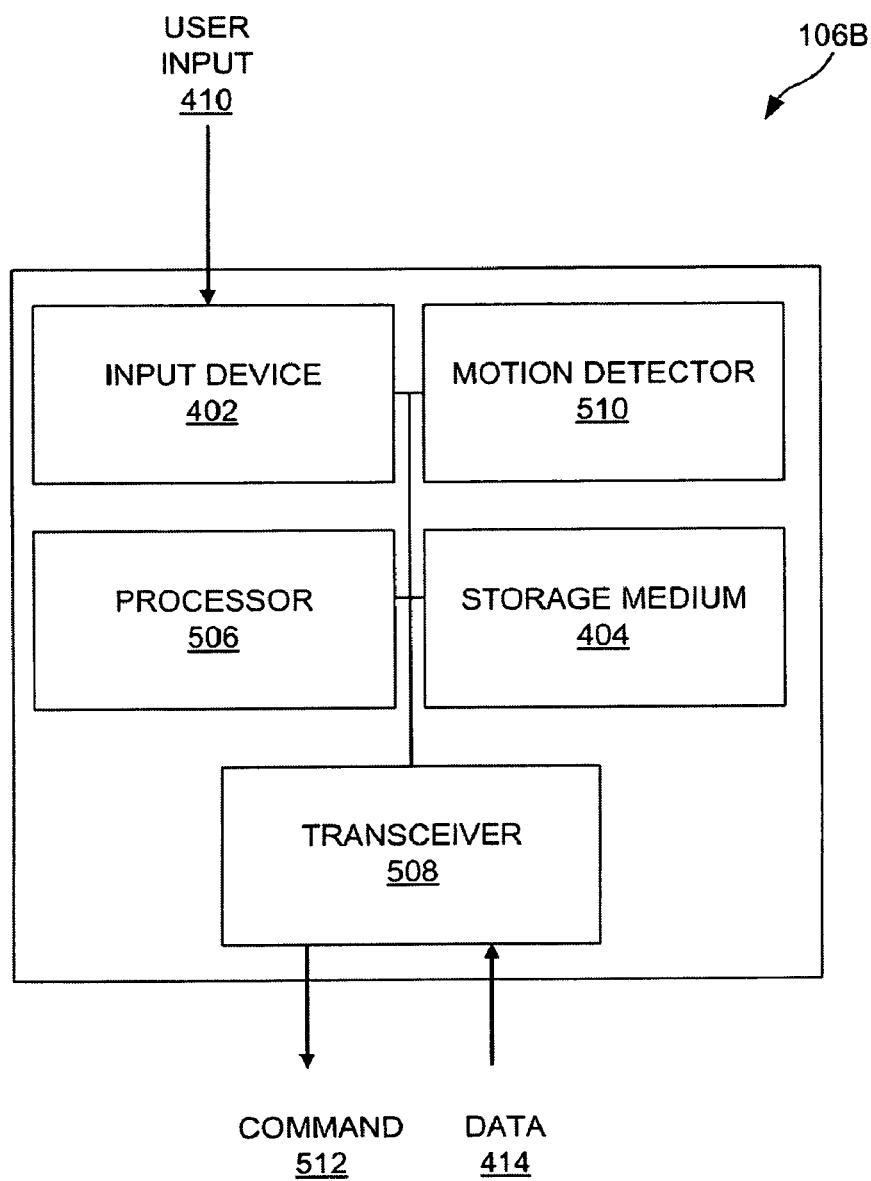
FIG. 5 illustrates another embodiment of a mobile communication device of FIG. 2.

FIG. 5 illustrates another embodiment of a mobile communication device 106B of FIG. 2. FIG. 5 will be discussed in reference to the communication system 200 illustrated in FIG. 2. The mobile communication device 106B includes an input device 402, a motion detector 510, a storage medium 404, a processor 506 and a transceiver 408. Each of these components is discussed in greater detail below. The description of components common to mobile communication device 106A of FIG. 4 is omitted herein for the sake of brevity. The mobile communication device 106B may include other components, devices or elements not illustrated for the sake of brevity.

The motion detector 510 is operable for determining positional information regarding the mobile communication device 106B. The positional information is utilized to generate commands for the entertainment device 102 (see FIG. 2). Exemplary motion detector devices include mechanical switches, gyroscopes and accelerometers. Motion detectors may be utilized that detect motion, vibration or acceleration among any number of axis. For example, a three element accelerometer may be utilized for detecting accelerations along an x, y and z axis.

In at least one embodiment, the entertainment device 102 may include a sensor bar that emanates multiple light sources. For example, the sensor bar may be mounted in a stationary position near the entertainment device 102 (see FIG. 2). The motion detector 510 is operable to detect and measure the intensity and size of the light sources. Responsive to measuring the intensity and size of the light sources, the motion detector 510 performs mathematical operations to determine the coordinates (e.g., positional information) of the mobile communication device 106B. The positional information, including coordinates of the mobile communication device 106B and/or the direction of movement may be utilized to determine the coordinates of a cursor outputted for presentation by the entertainment device 102.

The processor 506 is operable for generating commands that are compatible with the entertainment device 102 (see FIG. 2). The processor 506 receives the user input 410 from the input device 402 and the positional information from the motion detector 510 and translates the user input 410, the positional information and/or the identifying data from the storage medium 404 into the command 512. The transceiver 408 transmits the command 512 to the entertainment device 102.

Those of ordinary skill in the art will appreciate that the various functional elements 402 through 406 and 506 through 510 shown as operable within the mobile communication device 106B may be combined into fewer discrete elements or may be broken up into a larger number of discrete functional elements as a matter of design choice. Thus, the particular functional decomposition suggested by FIG. 5 is intended merely as exemplary of one possible functional decomposition of elements within the mobile communication device 106B.

Figure 6:
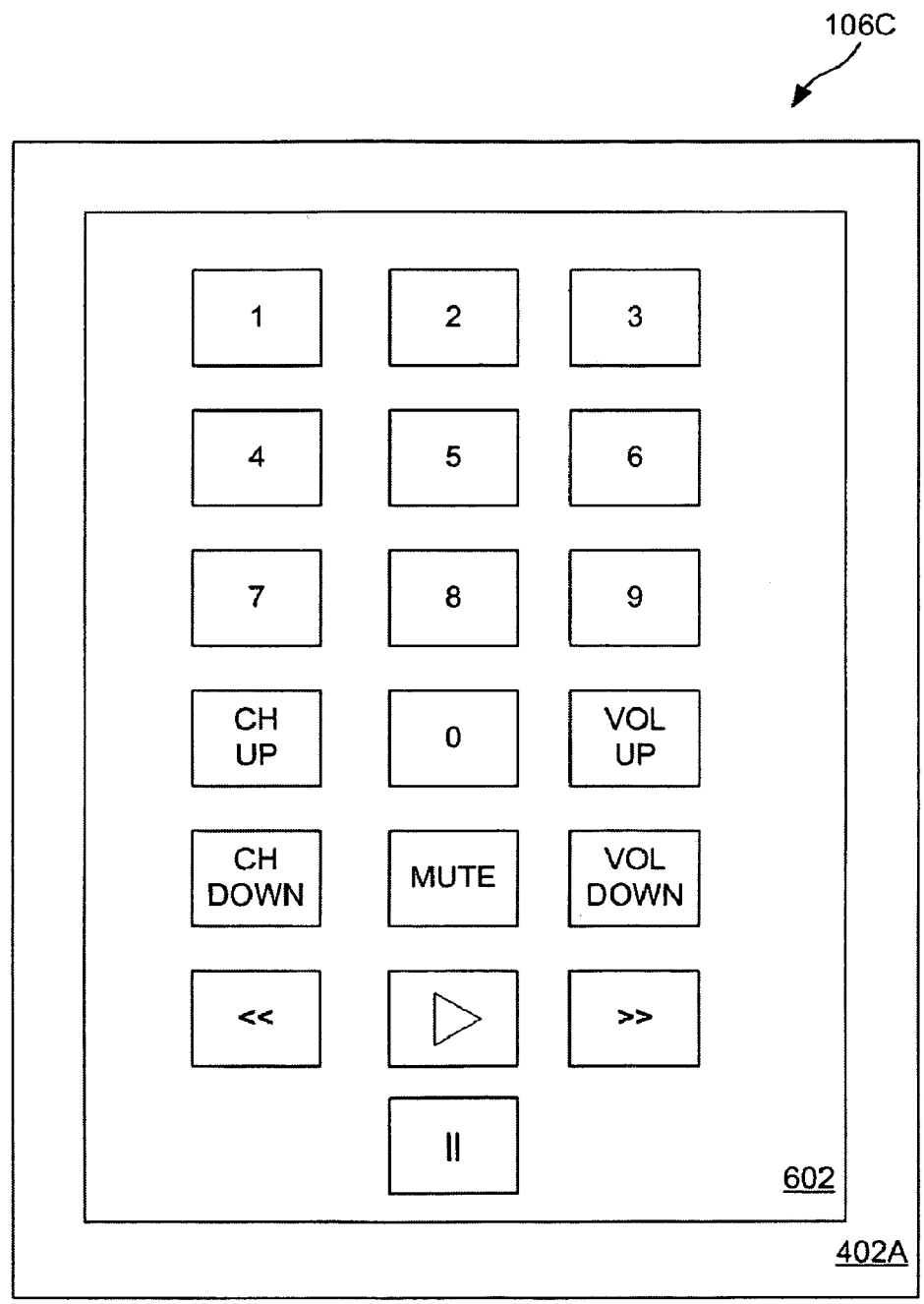
FIG. 6 illustrates an exemplary embodiment of a mobile communication device of FIG. 2.

FIG. 6 illustrates an exemplary embodiment of a mobile communication device 106C of FIG. 2. More particularly, FIG. 6 illustrates an embodiment of a virtual remote control 602 displayed on a touch screen of an input device 402A. The virtual remote control 602 is operable for emulating the remote control for the entertainment device 102 (see FIG. 2). As illustrated in FIG. 6, the virtual remote control 602 displays frequently used buttons/functions of a television receiver with an integrated DVR. Thus, a user can control the channels, volume or playback of video content outputted by the entertainment device 102. It is to be appreciated that the functions/button is presented by the virtual remote control 602 may vary depending on the functionality of the entertainment device 102 to be controlled.

In at least one embodiment, the virtual remote control 602 is downloaded by the mobile communication device 106C from the entertainment device 102 (see FIG. 2). For example, the mobile communication device 106C may download the virtual remote control 602 during a set-up process of the mobile communication device 106C. In other embodiments, the entertainment device 102 may transmit and updated virtual remote control 602 depending on a particular menu displayed by the entertainment device 102, or a particular functionality presently enabled on the entertainment device 102. For example, if the user 108 is presently viewing an electronic programming guide (EPG) on the entertainment device 102, then the virtual remote control 602 may be customized to emulate the EPG, allowing the user to touch a particular region of the input device 402 to select a program to watch. In other embodiments, the functions/buttons displayed by the virtual remote control 602 may vary depending on whether the user 108 is utilizing the television receiver or the DVR functionality of the entertainment device 102. For example, the mobile communication device 106C may store multiple virtual remote control 602 layouts and receive menu information from the entertainment device 102 (see FIG. 2) indicating the particular menu presently outputted for display. Responsive to receiving the menu information, the mobile communication device 106C selects and presents the appropriate virtual remote control 602 layout to the user 108.

Figure 7:
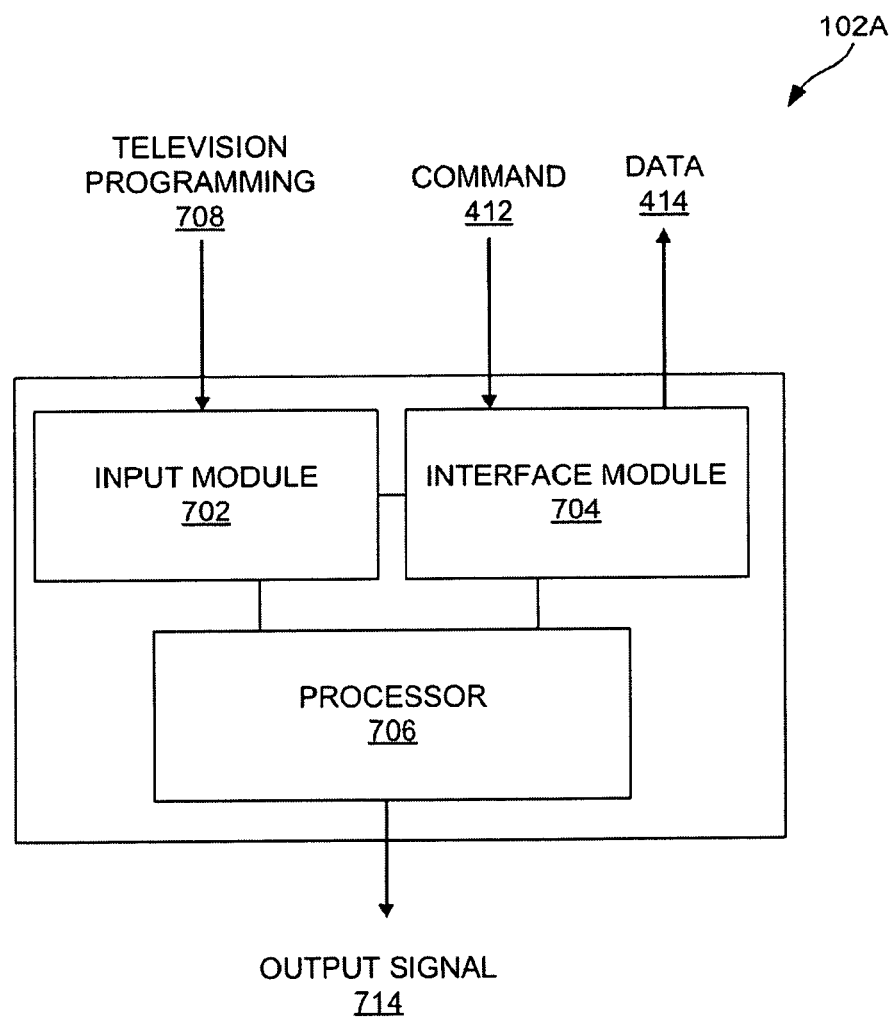
FIG. 7 illustrates an embodiment of an entertainment device of FIG. 2.

FIG. 7 illustrates an embodiment of an entertainment device 102A of FIG. 2. More particularly, FIG. 7 illustrates an entertainment device 102A embodied as a television receiver (e.g., a set-top box). However, it is to be appreciated that the entertainment device 102 may comprise any type of device that presents any type of presentation content. The entertainment device 102A includes an input module 702, an interface module 704 and a processor 706. Each of these components is discussed in greater detail below. The entertainment device 102A may include other components, devices or elements not illustrated for the sake of brevity.

The input module 702 is operable for receiving presentation content, e.g., television programming 708. The input module 702 may be operable for receiving and tuning any type of television programming 708. For example, the input module 702 may receive an over-the-air distribution broadcast, a direct broadcast satellite signal or a cable television signal. In at least one embodiment, the input module 702 may receive or retrieve content from a storage medium, such as an optical disk, internal or external hard drives, portable storage devices (e.g., universal serial bus (USB) memory sticks) and the like. The input module 702 may also receive content from external servers, such as video servers, that are communicatively coupled over the internet or other types of data networks. In at least one embodiment, the television programming 708 may be locked and thus accessible upon proper authentication of the user 108 (see FIG. 2).

The interface module 704 is operable to wirelessly receive and/or transmit data to the mobile communication device 106 (see FIG. 2). The interface module 704 may communicate with the mobile communication device 106A utilizing any type of IR or RF communication link. In at least one embodiment, the interface module 704 receives the command 412 from the mobile communication device 106, and responsively provides the command 412 to the processor 706. The interface module 704 may receive identifying data regarding the user 108 (see FIG. 2) from the mobile communication device 106 as part of the command 412 or as a separate data transmission (e.g., responsive to a query). In some embodiments, the interface module 704 receives the data 414 and responsively transmits the data 414 to the mobile communication device 106 for transmission to the application server 204.

The processor 706 is operable for controlling the operation of the entertainment device 102 (see FIG. 2). In at least one embodiment, the processor 706 receives the television programming 708 and responsively generates an output signal 714 for presentation on a display device. The processor 706 is further operable to receive the command 412 and manipulate the playback of the television programming 708 responsive to the command. In other words, the processor 706 operates responsive to the command 412 to control the output signal 714. In at least one embodiment, the output signal 714 may be generated responsive to authenticating the user 108 based on the identifying data. In some embodiments, the identifying data may be used by the processor 706 to identify the user 108 and perform other functions that generate data transmitted to external sources.

For example, the processor 706 may be operable to generate data 414 that is transmitted to the application server 204 (see FIG. 2) through the mobile communication device 106. In at least one embodiment, the processor 706 generates demographic information based on the television programming 708, the command 412 and the identifying data regarding the user 108. The demographic information is then transmitted to the application server 204. The processor 706 may also utilize the collected information to update social networking profiles, buddy lists and other information regarding the user 108.

Those of ordinary skill in the art will appreciate that the various functional elements 702 through 706 shown as operable within the entertainment device 102A may be combined into fewer discrete elements or may be broken up into a larger number of discrete functional elements as a matter of design choice. Thus, the particular functional decomposition suggested by FIG. 7 is intended merely as exemplary of one possible functional decomposition of elements within the mobile communication device 106A.

Figure 8:
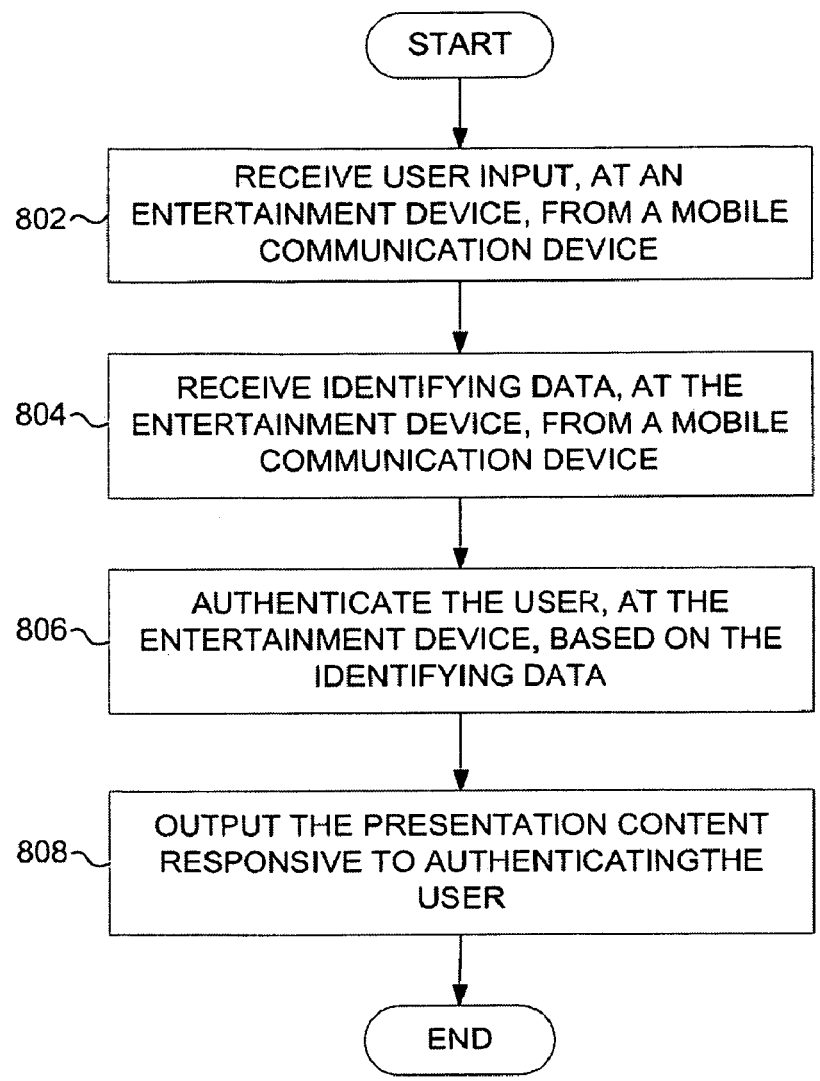
FIG. 8 illustrates an embodiment of a process for outputting presentation content by an entertainment device.

FIG. 8 illustrates an embodiment of a process for outputting presentation content by an entertainment device. More particularly, FIG. 8 illustrates a process for manipulating the playback of video content by an entertainment device based on a command inputted by a user into a mobile communication device. The operations of the process of FIG. 8 are not all-inclusive, and may comprise other operations not illustrated for the sake of brevity.

The process includes receiving user input, at the entertainment device, from a mobile communication device, the user input requesting output of presentation content by the entertainment device (operation 802). The entertainment device receives the user input over a wireless communication link, e.g., IR, Bluetooth or other types of RF communication links. In at least one embodiment, the user input may request output by the entertainment device of presentation content which is locked and only available upon authentication of the user. For example, the user input may request output of a specific channel of content. The user input may also request manipulation of the presentation content, e.g., pausing, fast-forwarding, reversing, volume changes and the like.

The process further includes receiving identifying data, at the entertainment device, from the mobile communication device (operation 804). The identifying data identifies a user of the mobile communication device. The identifying data may be provided with the user input transmitted by the mobile communication device, or may be provided separately, e.g., responsive to a query from the entertainment device.

The process further includes authenticating the user, at the entertainment device, based on the identifying data (operation 806). In at least one embodiment, the entertainment device compares the identifying data with locally stored information to authenticate the user. In other embodiments, the entertainment device may query an external source to authenticate the user. If the user input requests access to locked presentation content, then the entertainment device provides access to the locked presentation content responsive to authenticating the user. If the user is not authenticated, either because the identifying data provided is incorrect or they are not entitled access to the content, then the entertainment device may present some type of error message or other notification to the user.

The process further includes outputting the presentation content for presentation on a presentation device, based on the user input, responsive to authenticating the user (operation 808). In at least one embodiment, the entertainment device is integrated with the presentation device. For example, the entertainment device may be a television. Thus, outputting the presentation content includes passing the content to a video controller that displays the content on screen. In other embodiments, the entertainment device may be separate from the entertainment device, e.g., a set-top box. Thus, outputting the content may include outputting a video signal for transmission to a separate presentation device.

Figure 9:
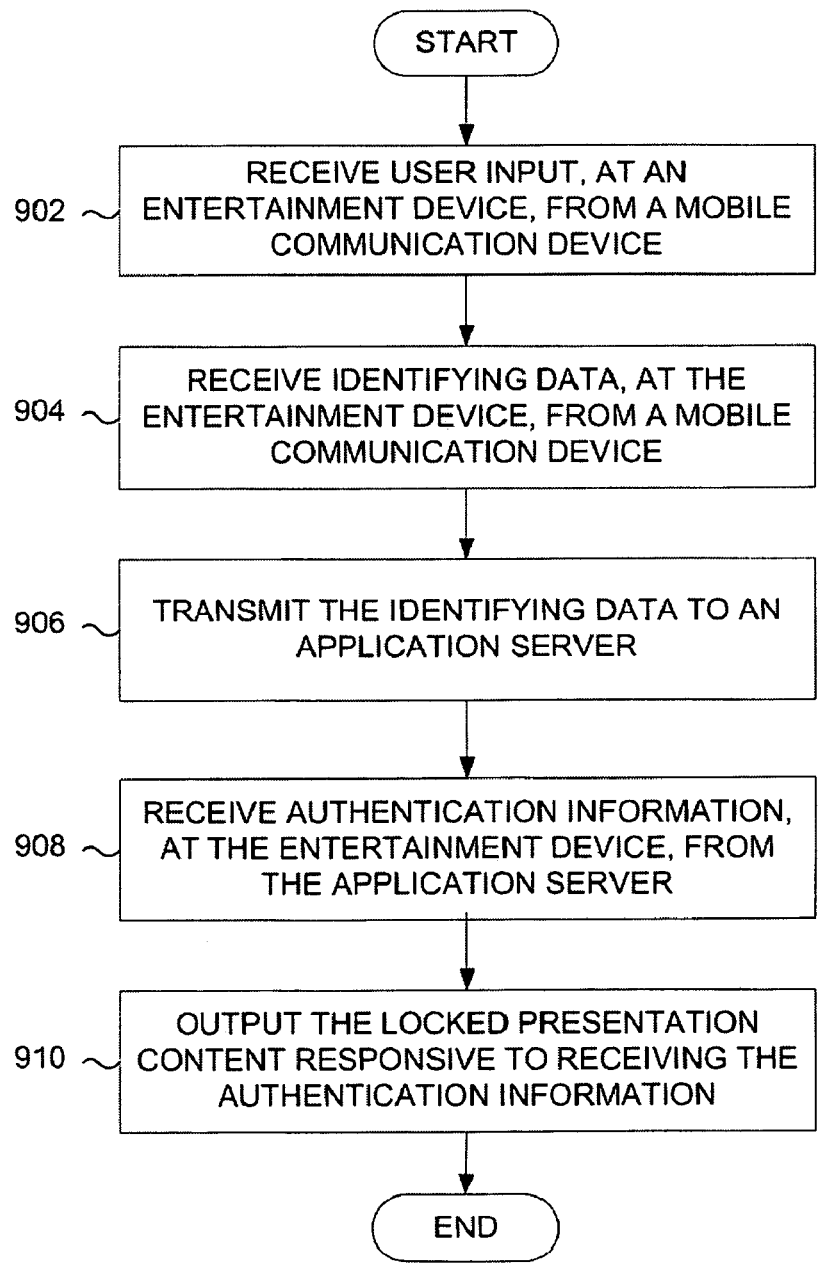
FIG. 9 illustrates an embodiment of a process for outputting locked presentation content by an entertainment device.

FIG. 9 illustrates an embodiment of a process for outputting locked presentation content by an entertainment device. The operations of the process of FIG. 9 are not all-inclusive, and may comprise other operations not illustrated for the sake of brevity.

The process includes receiving user input, at the entertainment device, from a mobile communication device (operation 902). The user input requests presentation of locked presentation content available through the entertainment device. For example, the user input may request presentation of specific "locked" channels of a set-top box or may request presentation of a PPV or VOD video.

The process further includes receiving identifying data, at the entertainment device, from the mobile communication device (operation 904). The identifying data identifies a user of the mobile communication device. In at least one embodiment, the user of the mobile communication device is also a registered user of the entertainment device. For example, the user may have an account on the entertainment device. In other embodiments, the user of the mobile communication device may not be a registered user of the entertainment device. For example, the user may be a guest or visitor in the home containing the entertainment device.

The process further includes transmitting the identifying data to an application server (operation 906). The identifying data is transmitted to the application server for authentication of the user to access the locked presentation content. The entertainment device may transmit the identifying data to the application server through a communicatively coupled data network or may transmit the identifying data to the application server through the mobile communication device. For example, the entertainment device may generate a request, based on the user input and the identifying data, and transmit the request to the mobile communication device. The mobile communication device then transmits the data over a wireless network to the application server. Likewise, the mobile communication device receives data from the application server (e.g., a response to the authentication request) and transmits the data to the entertainment device for further processing.

The process further includes receiving, at the entertainment device, from the application server, authentication information allowing the user to access the locked presentation content (operation 908). As described above, the entertainment device may communicate with the application server through a data network or may communicate with the application server via the mobile communication device. The application server may perform other functions when transmitting the authentication information to the entertainment device, such as billing the user for the access to the locked presentation content.

Responsive to receiving the authentication information, the entertainment device outputs the locked content for presentation on a presentation device (operation 910). If the response from the server indicates that the user should not be allowed access to the presentation content, then the entertainment device may provide such notification to the user.

One advantage to the above described process is that a user of a mobile communication device may order PPV content at any location, regardless of whether the user is associated with the account of the entertainment device. For example, a Dish Network® subscriber may be visiting a friend and desire to watch a PPV video. The subscriber utilizes their mobile communication device to remotely control the entertainment device and order the PPV video. The entertainment device transmits a request to an application server and the application server authenticates the subscriber's request to order the video. The application server then transmits an authentication response to the entertainment device that indicates that the subscriber is entitled to access the video. The subscriber watches the movie and their account is billed for the PPV rather than the owner of the entertainment device. Thus, problems with guests ordering PPV videos are avoided because the guest is billed directly for the received content. Similarly, a guest could be billed for the content on their telephone bill without actually having a Dish Network® subscription. It will be appreciated that other techniques may be utilized to bill a user for accessing content based on the identifying data.

The identifying data may also be utilized to allow a user to make purchases through a home shopping program. For example, a user may see a product that they desire to purchase and may utilize their mobile communication device to control the entertainment device and make a purchase of the product. The entertainment device may use the identifying data to generate an order that is transmitted to the application server. Responsive to receiving the order, the application server bills the user and completes the order of the product.

Figure 10:
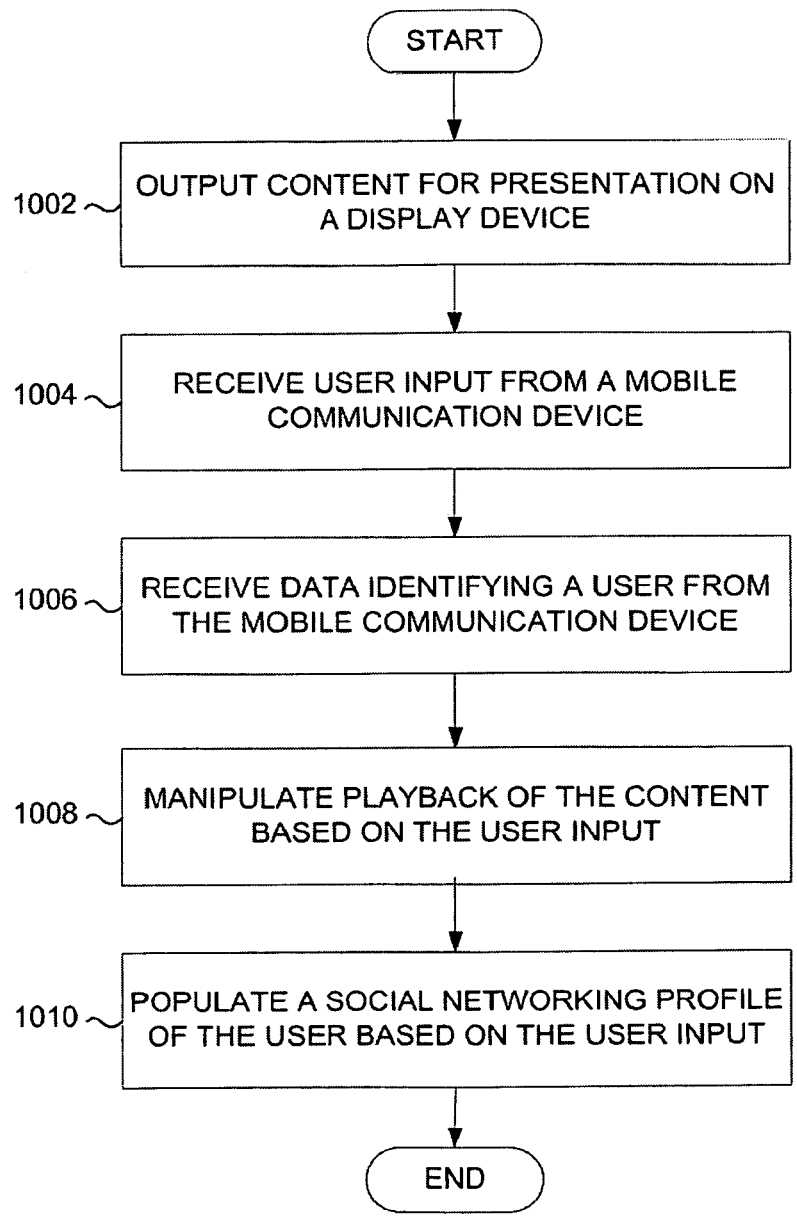
FIG. 10 illustrates an embodiment of a process for populating a social networking profile of a user based on viewing data.

The identifying data may also be utilized to populate a social networking profile of a user. FIG. 10 illustrates an embodiment of a process for populating a social networking profile of a user based on viewing data. More particularly, FIG. 10 illustrates a process for populating a profile of the user when the user utilizes a mobile communication device to remotely operate an entertainment device. The operations of the process of FIG. 10 are not all-inclusive, and may comprise other operations not illustrated for the sake of brevity.

The process includes outputting content for presentation on a display device (operation 1002). The content may be outputted based on user input received from a mobile communication device. The process further includes receiving user input from a mobile communication device requesting manipulation of playback of content presented by an entertainment device (operation 1004). The user input may request any kind of manipulation of the content, such as channel changes, volume changes and pausing of live or recorded content.

The process further includes receiving data identifying a user from the mobile communication device (operation 1006). The identifying data may be any type of information that identifies the user individually or as a member of a group. For example, the data may identify the user as a member of a certain group or as having specific characteristics (e.g., an 18-40 year male). The identifying data may be collected using a variety of techniques. For example, the identifying data may be collected based on account information of the user of the mobile communication device. The identifying data may also be collected based on user responses to a survey or other questionnaire. In at least one embodiment, the identifying data may include a username or account number of the user on a social network. In some embodiments, the identifying data may be transmitted with each command from the mobile communication device. The identifying data may be transmitted with the first command during a viewing session or periodically during the viewing session. The process further includes manipulating playback of the content based on the user input (operation 1008).

The process further includes populating a social networking profile of the user based on the user input (operation 1010). For example, if the entertainment device determines that a user changed the channel to watch a program, then a message may be displayed to members of the user's buddy lists that they are presently watching that particular program. Thus, the friends may then tune to that program as well, or may know not to disturb the user during the time period of that particular program based on the message displayed in the buddy lists. The profile update message function may be performed automatically by the entertainment device, or may be performed responsive to input by the user. For example, the user may press a particular key of the mobile communication device to initiate the profile update function on the entertainment device.

In at least one embodiment, the entertainment device may communicate with an application server through a data network communicatively coupled to the entertainment device. For example, the entertainment device may be connected to a broadband network, and may transmit data to the application server through the broadband network. In other embodiments, the entertainment device may communicate with the application server through the mobile communication device. In other words, the mobile communication device receives data from the entertainment device, and further transmits the data to the application server through a wireless network.

In at least one embodiment, the entertainment device may tabulate the programs that the user frequently watches over a period of time, and responsively update the user's social networking profile based on the tabulated information. For example, the entertainment device may identify that a user watches every new episode of a particular program, and may responsively update the favorite shows section of the user's social networking profile to reflect this information.

In at least one embodiment, the tabulated information may be transmitted from the entertainment device to the mobile communication device after each episode or viewing session for storage and further updating. Thus, if a user utilizes multiple entertainment devices to regularly view video content, then the mobile communication device can provide the tabulation data to an entertainment device during each viewing session for updating based on the programming viewed by the user. Thus, the tabulated information is aggregated based on viewing across multiple entertainment devices during different viewing sessions.

Figure 11:
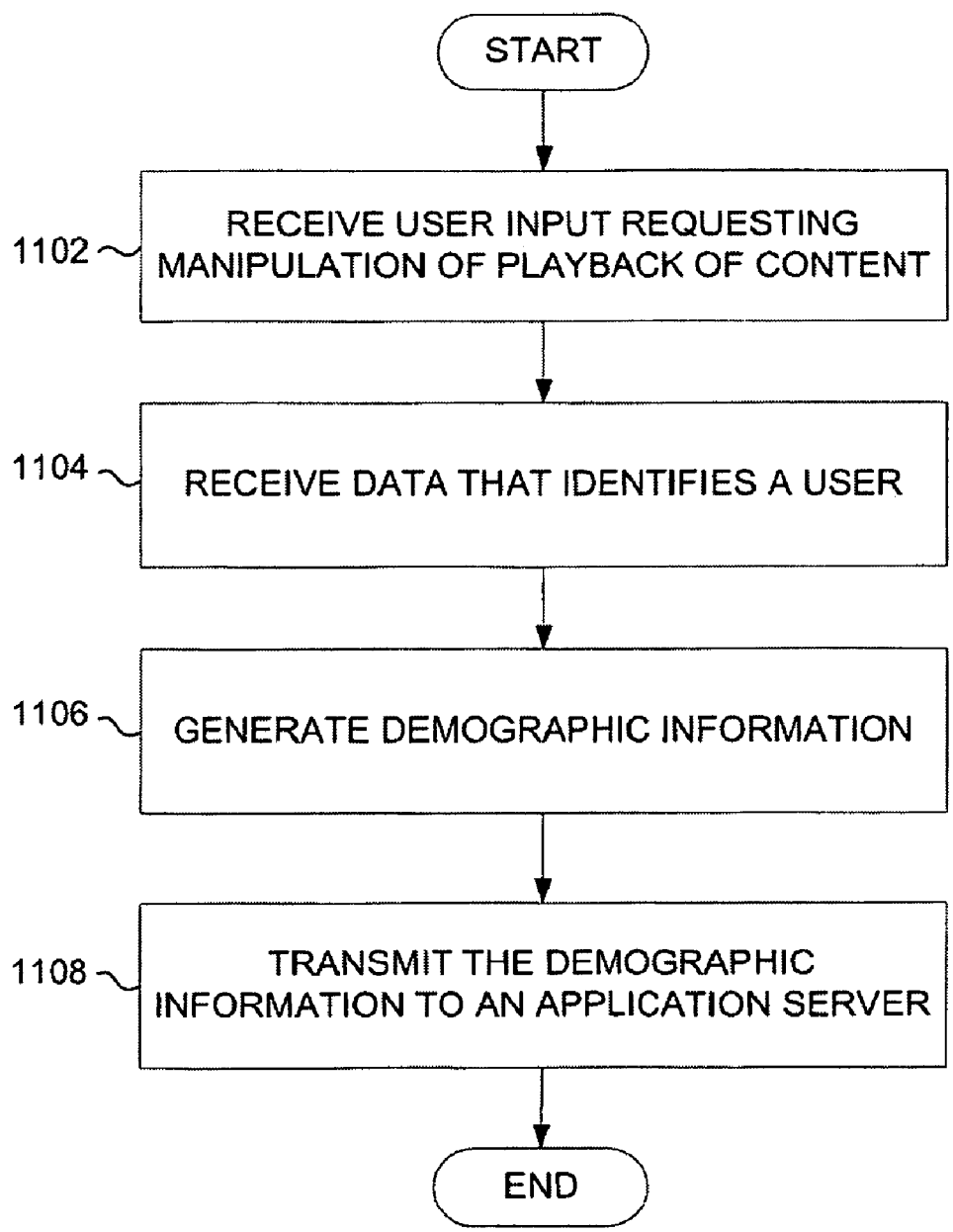
FIG. 11 illustrates an embodiment of a process for collecting demographic information regarding video programming.

The data collected by the entertainment device may be utilized for other purposes, such as aggregating demographic information regarding television programming. FIG. 11 illustrates an embodiment of a process for collecting demographic information regarding video programming. The operations of the process of FIG. 11 are not all-inclusive, and may comprise other operations not illustrated for the sake of brevity.

The process includes receiving user input requesting manipulation of playback of content on an entertainment device (operation 1102). In at least one embodiment, the user input is received by a mobile communication device and transmitted to an entertainment device for processing. The process further includes receiving data that identifies a user (operation 1104).

The process further includes generating demographic information regarding the content based on the identifying data (operation 1106). It is to be appreciated that the demographic information may include any type of information regarding the user's viewing characteristics. For example, the demographic information may identify that a male between the ages of 18-40 watched a particular program on a particular date. The demographic information may include further granularity, such that the user watched the program until the commercial break, and then channel surfed for 2 minutes before switching back to the original program they were watching.

The process further includes transmitting the demographic information to an application server (operation 1108). In at least one embodiment, the entertainment device may transmit the demographic information using a data network communicatively coupled to the entertainment device. In other embodiments, the demographic information may be transmitted to the application-server through the mobile communication device. Thus, the mobile communication device may operate as a backchannel for the demographic information. The application server can then utilize the demographic information to generate reports and other information regarding the video programming.

In at least one embodiment, the demographic information may also be utilized locally to target advertisements to a user. The entertainment device may determine the appropriate demographic group for the user, and may insert a targeted advertisement within the video program. The entertainment device may request appropriate ads from an application server during the viewing session, or may store a bank of advertisements and select the most appropriate advertisements for the user based on the demographic information. Thus, the user is presented with an advertisement that has the most likely appeal based on the user's demographic information.

Although specific embodiments were described herein, the scope of the invention is not limited to those specific embodiments. The scope of the invention is defined by the following claims and any equivalents therein.

What is claimed is:

1. A method for outputting locked presentation content by an entertainment device, the method comprising:
   receiving user input, at the entertainment device, from a mobile communication device, the user input requesting output of locked presentation content by the entertainment device, the locked presentation content being accessible on a per-user basis;
   receiving identifying data, at the entertainment device, from the mobile communication device, the identifying data regarding a user of the mobile communication device;
   authenticating the user, at the entertainment device, to access the locked presentation content of the entertainment device, based on the identifying data; and
   outputting the locked presentation content for presentation on a presentation device, based on the user input, responsive to authenticating the user.

2. The method of claim 1, wherein the locked presentation content comprises an on-demand video that is streamed to the entertainment device.

3. The method of claim 1, wherein the locked presentation content comprises a video stored on the entertainment device.

4. The method of claim 1, further comprising:
   populating a social networking profile of the user based on the user input and the identifying data.

5. The method of claim 1, further comprising:
   generating demographic information, regarding the locked presentation content, responsive to authenticating the user.

6. The method of claim 1, wherein authenticating the user further comprises:
   generating a request, at the entertainment device, based on the user input and the identifying data;
   transmitting the request, from the entertainment device, to the mobile communication device; and
   transmitting the request, from the mobile communication device, to an application server.

7. The method of claim 1, further comprising:
   billing the user, for the access to the locked presentation content, based on the identifying data.

8. A method for outputting locked presentation content by an entertainment device, the method comprising:
   receiving user input, at the entertainment device, from a mobile communication device, the user input requesting presentation of locked presentation content available through entertainment device, the locked presentation content being accessible on a per-user basis;
   receiving identifying data, at the entertainment device, from the mobile communication device, the identifying data regarding a user of the mobile communication device;
   transmitting the identifying data to an application server;
   receiving, at the entertainment device, from the application server, authentication information allowing the user to access the locked presentation content; and
   outputting the locked presentation content, from the entertainment device, for presentation on a presentation device, responsive to the entertainment device receiving the authentication information.

9. The method of claim 8, wherein the locked presentation content comprises an on-demand video that is streamed to the entertainment device.

10. The method of claim 8, wherein the locked presentation content comprises a video stored on the entertainment device.

11. The method of claim 8, wherein the locked presentation content comprises audio content stored on the entertainment device.

12. The method of claim 8, wherein transmitting the identifying data to the application server further comprises:
generating a request, at the entertainment device, based on the user input and the identifying data;
transmitting the request, from the entertainment device, to the mobile communication device; and
transmitting the request, from the mobile communication device, to the application server.

13. The method of claim 8, further comprising:
billing the user, for the access to the locked presentation content, based on the identifying data.

14. An entertainment device comprising:
an input module that receives locked presentation content from at least one content source, the locked presentation content being accessible on a per-user basis;
an interface module that wirelessly communicates with a mobile communication device to receive user input and identifying data, the user input requesting access to the locked presentation content and the identifying data regarding a user of the mobile communication device;
a processor communicatively coupled to the input module and the interface module that authenticates the user based on the identifying data and that further outputs the locked presentation content for presentation on a presentation device, based on the user input, responsive to authenticating the user.

15. The entertainment device of claim 14, wherein the locked presentation content comprises an on-demand video that is streamed to the entertainment device.

16. The entertainment device of claim 14, wherein the locked presentation content comprises a video stored on the entertainment device.

17. The entertainment device of claim 14, wherein the interface module further receives a command, from the mobile communication device, the command instructing the processor to manipulate the output of the locked presentation content.

18. The entertainment device of claim 14, wherein the processor transmits a request to an application server, the request including information utilized by the application server to populate a social networking profile of the user, based on the user input and the identifying data.

19. The entertainment device of claim 14, wherein the processor generates demographic information, regarding the locked presentation content, based on the user input, responsive to authenticating the user.

20. A mobile communication device comprising:
an input device that receives user input requesting playback of locked presentation content available for output by an entertainment device, the locked presentation content being accessible on a per-user basis;
a storage medium that stores identifying data regarding a user of the mobile communication device;
a processor communicatively coupled to the input device and communicatively coupled to the storage medium that translates the user input and the identifying data into a command compatible with the entertainment device; and
a wireless transmitter that transmits the command to the entertainment device wherein the entertainment device utilizes the command to authenticate the user and output the locked presentation content for presentation on a presentation device.

21. The mobile communication device of claim 20, further comprising:
a wireless receiver that receives a request from the entertainment device requesting authentication for the user to access the locked presentation content;
wherein the wireless transmitter transmits the request to an application server;
wherein the wireless receiver receives an authentication response from the application server responsive to the request; and
wherein the wireless transmitter transmits the authentication response to the entertainment device.

22. The mobile communication device of claim 20, further comprising:
a wireless receiver that receives a request from the entertainment device, the request including information utilized by an application server to populate a social networking profile of the user based on the user input;
wherein the wireless transmitter transmits the request to the application server.

23. The mobile communication device of claim 20, further comprising:
a wireless receiver that receives demographic information from the entertainment device, the demographic information generated by the entertainment device based on the command;
wherein the wireless transmitter transmits the demographic information to the application server.

* * * * *

UNITED STATES PATENT AND TRADEMARK OFFICE
CERTIFICATE OF CORRECTION

| | | |
|---|---|---|
| PATENT NO. | : 8,152,642 B2 | |
| APPLICATION NO. | : 12/046568 | |
| DATED | : April 10, 2012 | |
| INVENTOR(S) | : Charles W. Ergen et al. | |

It is certified that error appears in the above-identified patent and that said Letters Patent is hereby corrected as shown below:

Column 14, Line 56:
"through entertainment device, the locked presentation" should read, --through the entertainment device, the locked presentation--.

Signed and Sealed this
Third Day of July, 2012

David J. Kappos
*Director of the United States Patent and Trademark Office*